(12) United States Patent
Hayashi (10) Patent No.: US 6,327,235 B1
(45) Date of Patent: Dec. 4, 2001

(54) OPTICAL RECORDING MEDIUM, AND RECORDING/REPRODUCING METHOD AND APPARATUS THEREFOR

(75) Inventor: Hideki Hayashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/369,146

(22) Filed: Aug. 5, 1999

(30) Foreign Application Priority Data

Aug. 6, 1998 (JP) .................................................. 10-223375

(51) Int. Cl.$^7$ ...................................................... G11B 7/00
(52) U.S. Cl. ...................... 369/59.1; 369/59.23; 369/47.1
(58) Field of Search ................ 369/47.1, 47.11, 369/47.15, 47.18, 47.21, 53.1, 53.34, 53.41, 59.1, 59.11, 59.12, 59.13, 59.23, 59.27, 124.01

(56) References Cited

U.S. PATENT DOCUMENTS 5,666,339 * 9/1997 Honguh ........................... 369/124.13
5,881,039 * 3/1999 Sano et al. ......................... 369/59.15

* cited by examiner

*Primary Examiner*—Muhammad Edun
(74) *Attorney, Agent, or Firm*—Sughrue, Mion, Zinn, Macpeak & Seas, PPLC (57) ABSTRACT

A recording/reproducing method and apparatus for processing m-value (m is an integer at least equal to two) digital information data to produce recording data, for recording the recording data on an optical recording medium, for reading recording data from the optical recording medium, and for processing the read recording data to reproduce the information data as reproduced data. A predetermined relationship is established between information data x and n (n is an integer at least equal to two) of recording data y1–yn, and another predetermined relationship is established between reproduced data z and the recording data y1–yn.

9 Claims, 12 Drawing Sheets

| x | y2 | y3 | y1 | u | z |
|---|----|----|----|----|---|
| 0 | 0 | 0 | 0 | 0 | 0 |
| 0 | 0 | 1 | 1 | 2 | 0 |
| 0 | 1 | 0 | 0 | 2 | 0 |
| 0 | 1 | 1 | 1 | 4 | 0 |
| 1 | 0 | 0 | 1 | 1 | 1 |
| 1 | 0 | 1 | 0 | 1 | 1 |
| 1 | 1 | 0 | 1 | 3 | 1 |
| 1 | 1 | 1 | 0 | 3 | 1 |

| x | y2 | y3 | y1 | u | z |
|---|----|----|----|---|---|
| 0 | 0 | 0 | 0 | 0 | 0 |
| 0 | 0 | 1 | 2 | 3 | 0 |
| 0 | 0 | 2 | 1 | 3 | 0 |
| 0 | 1 | 0 | 1 | 3 | 0 |
| 0 | 1 | 1 | 0 | 3 | 0 |
| 0 | 1 | 2 | 2 | 6 | 0 |
| 0 | 2 | 0 | 2 | 6 | 0 |
| 0 | 2 | 1 | 1 | 6 | 0 |
| 0 | 2 | 2 | 0 | 6 | 0 |
| 1 | 0 | 0 | 1 | 1 | 1 |
| 1 | 0 | 1 | 0 | 1 | 1 |
| 1 | 0 | 2 | 2 | 4 | 1 |
| 1 | 1 | 0 | 2 | 4 | 1 |
| 1 | 1 | 1 | 1 | 4 | 1 |
| 1 | 1 | 2 | 0 | 4 | 1 |
| 1 | 2 | 0 | 0 | 4 | 1 |
| 1 | 2 | 1 | 2 | 7 | 1 |
| 1 | 2 | 2 | 1 | 7 | 1 |
| 2 | 0 | 0 | 2 | 2 | 2 |
| 2 | 0 | 1 | 1 | 2 | 2 |
| 2 | 0 | 2 | 0 | 2 | 2 |
| 2 | 1 | 0 | 0 | 2 | 2 |
| 2 | 1 | 1 | 2 | 5 | 2 |
| 2 | 1 | 2 | 1 | 5 | 2 |
| 2 | 2 | 0 | 1 | 5 | 2 |
| 2 | 2 | 1 | 0 | 5 | 2 |
| 2 | 2 | 2 | 2 | 8 | 2 |

OPTICAL RECORDING MEDIUM, AND RECORDING/REPRODUCING METHOD AND APPARATUS THEREFOR

BACKGROUND OF THE INVENTION

1. Field of the Invention

The present invention relates to an optical recording medium, and an optical recording medium recording/reproducing method and apparatus for recording or reproducing digital data on and from the optical recording medium.

2. Description of the Related Background Art

A crosstalk canceling technique is known as a method of recording and reproducing digital data on and from an optical disc as an optical recording medium at a high density. This technique is applied to playing back an optical disc on which data is recorded at a high density with a narrower track pitch, for canceling crosstalk introduced into a central track from neighboring tracks on both inner and outer sides thereof by irradiating the three neighboring tracks with three reading laser light beams and adding and/or subtracting read signals produced by the respective laser light beams for reading.

Figure 1:
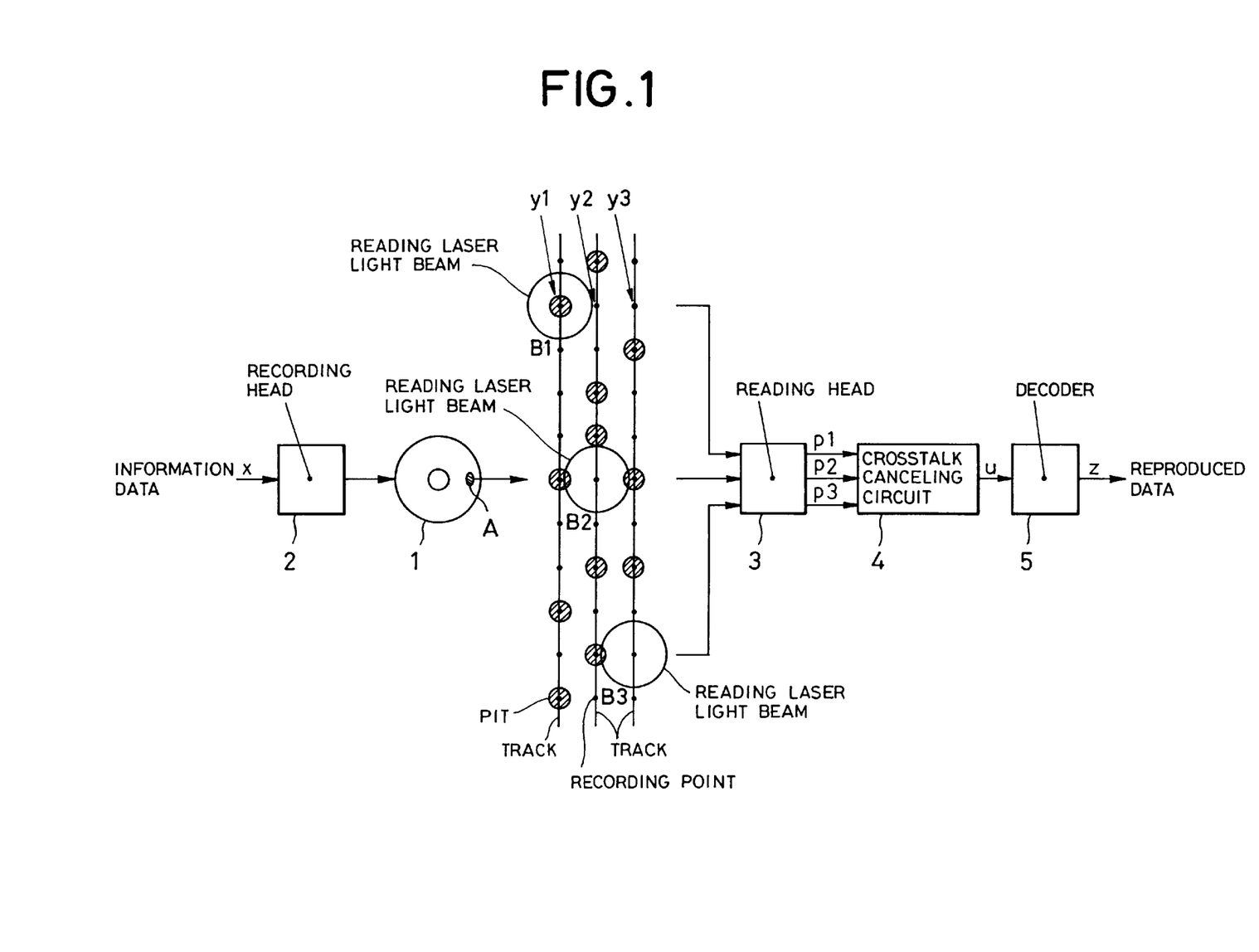
FIG. 1 is a block diagram illustrating a conventional optical disc recording/reproducing apparatus.

FIG. 1 illustrates an optical disc recording/reproducing apparatus to which the crosstalk canceling technique is applied. On a recording surface of an optical disc 1, recording points are arranged in a lattice form. FIG. 1 also illustrates by enlarging a portion A on the recording surface of the optical disc 1, where black dots represent recording points at which binary digital data is respectively recorded in the form of presence or absence of a pit.

A recording head 2 turns on or off a recording laser light beam in accordance with information data x to form a pit train on a track of the disc 1. Specifically, the recording head 2 turns on the recording laser light beam to form a pit at a recording point when information data is "1," and turns off the recording laser light beam to not form a pit at a recording point when information data is "0."

A reading head 3 irradiates three neighboring tracks on the optical disc 1 with three reading laser light beams B1, B2, B3, respectively, and opto-electrically transduces the respective reading laser light beams after they have been reflected from the optical disc 1 to produce three read signals p1, p2, p3 in accordance with trains of pits recorded on the three tracks. In this case, since the tracks are formed at a narrow track pitch, the read signal p2 from the central track suffers crosstalk introduced from the read signals p1, p3 from the tracks on both inner and outer sides thereof.

A crosstalk canceling circuit 4 receives the three read signals p1, p2, p3, and adds and/or subtracts these signals in a predetermined ratio to cancel crosstalk. Specifically, the read signals p1, p3 from the neighboring tracks are multiplied by predetermined coefficients to duplicate crosstalk introduced into the read signal p2 from the central track. Then, the crosstalk thus duplicated is subtracted from the read signal p2 on the central track to cancel the crosstalk therefrom.

A decoder 5 determines the level of a read signal after the crosstalk has been eliminated therefrom to reconstruct digital data as reproduced data z. The reproduced data z reconstructed in this way is equal to recording data y2 on the central track. In other words, the relationship between these data z and y2 is expressed by:

$$z=y2 \quad (1)$$

With the use of the crosstalk canceling technique as described above, the track pitch can be narrowed to some degree to enhance recording density of the optical disc. However, the reduction of the track pitch is substantially limited to the radius of a reading laser light beam. When the track pitch is made significantly narrower than the radius of the beam, the crosstalk canceling circuit can no longer eliminate crosstalk because the narrower track pitch causes an increased amount of crosstalk. Since it is impossible to significantly reduce the track pitch as compared with the radius of the reading laser light beam in the conventional recording/reproducing method, there is a limit to the enhancement of the recording density on the optical disc.

SUMMARY OF THE INVENTION

It is therefore an object of the present invention to provide an optical recording medium on which digital information data can be recorded at a higher density by reducing a track pitch to be significantly narrower than the radius of a reading laser light beam, and a recording/reproducing method and apparatus for the optical recording medium, which are capable of correctly reconstructing digital information data even from the optical recording medium on which the digital information data is recorded at a higher density by significantly narrowing the track pitch.

The present invention provides an optical recording medium recording/reproducing method for processing m-value (m is an integer at least equal to two) digital information data to produce recording data, for recording the recording data on an optical recording medium, for reading the recording data from the optical recording medium, and for processing the read recording data to produce the information data as reproduced data, comprising:

establishing a relationship expressed by:

$$y1=(k1 \cdot x - k2 \cdot y2 - \ldots - kn \cdot yn) \bmod m$$

where k1–kn are integer coefficients;

x is information data;

y1–yn are recording data; and mod.m represents a modulo-m residue calculation, between the information data x and n (n is an integer at least equal to two) of the recording data y1–yn positioned at intersections of n neighboring tracks within a plurality of tracks arranged at a predetermined track pitch on a recording surface of the optical recording medium with a straight line being perpendicular to the n tracks; and establishing a relationship expressed by:

$$z=(k1 \cdot y1 + k2 \cdot y2 + \ldots + kn \cdot yn) \bmod m$$

where z is reproduced data,
is established between the reproduced data z and the recording data y1–yn.

The present invention also provides an optical recording medium recording apparatus for processing m-value (m is an integer at least equal to two) digital information data to produce recording data, and for recording the recording data on an optical recording medium, the recording apparatus comprising a recording processing circuit for performing a calculation expressed by:

$$y1=(k1 \cdot x - k2 \cdot y2 - \ldots - kn \cdot yn) \bmod m$$

where k1–kn are integer coefficients;

x is information data;

y1–yn are recording data; and mod.m represents a modulo-m residue calculation, between the information data x and n (n is an integer at least equal to two) of the recording data y1–yn positioned at intersections of n neighboring tracks within a plurality of tracks arranged at a predetermined track pitch on a recording surface of the optical recording medium with a straight line being perpendicular to the n tracks; and a recording head for recording the recording data on the optical recording medium.

The present invention further provides an optical recording medium reproducing apparatus for reading recording data on an optical recording medium, and for processing the read recording data to reproduce m-value (m is an integer at least equal to two) digital data as reproduced data, the reproducing apparatus comprising a reading head for irradiating a first light beam to n (n is an integer at least equal to two) neighboring tracks within a plurality of tracks arranged at a predetermined track pitch on a recording surface of the optical recording medium, and a second light beam and a third light beam sandwiching the first light beam to produce three read signals in accordance with the first to third light beams after having reflected off the optical recording medium; a reproduction processing circuit for at least one of adding and subtracting the three read signals in a predetermined ratio to produce a mixed read signal; and a decoder for decoding the mixed read signal into the reproduced data, wherein a relationship expressed by:

$$z = (k1 \cdot y1 + k2 \cdot y2 + \ldots + kn \cdot yn) \bmod m$$

where k1–kn are integer coefficients;

y1–yn are recording data;

z is reproduced data; and mod.m represents a modulo-m residue calculation, is established between the reproduced data z and the recording data y1–yn positioned at intersections of n neighboring tracks with a straight line being perpendicular to the n tracks.

The present invention further provides an optical recording medium recording/reproducing method for processing m-value (m is an integer at least equal to two) digital information data to produce recording data, for recording the recording data on an optical recording medium, for reading the recording data from the optical recording medium, and for processing the read recording data to reproduce the information data as reproduced data, wherein the method including, during recording, defining recording regions for recording the recording data therein, and reference regions each having n (n is an integer at least equal to two) reference pits formed at different positions from each other in a track recording direction on n neighboring tracks within a plurality of tracks arranged at a predetermined track pitch on a recording surface of the optical recording medium, where the recording regions and the reference regions are positioned alternately in the track recording direction of the optical recording medium; the method including, during reproduction, irradiating a first light beam to the n neighboring tracks, and a second light beam and a third light beam sandwiching the first light beam to produce three read signals in accordance with the first to third light beams after having been reflected off the optical recording medium, at least one of adding and subtracting the three read signals in a predetermined ratio to produce a mixed read signal, and decoding the mixed read signal into the reproduced data; and the method further including controlling the predetermined ratio of the at least one of the addition and subtraction such that read levels corresponding to the n reference pits are in a ratio of k1:k2: . . . :kn in the mixed read signal, where k1–kn are integer coefficients.

The present invention further provides an optical recording medium recording apparatus for recording m-value (m is an integer at least equal to two) digital information data on an optical recording medium, comprising a recording processing circuit for subjecting the information data to a logical operation to output recording data; a reference data generating circuit for generating reference data corresponding to n (n is an integer at least equal to two) reference pits formed at different positions in a track recording direction on n neighboring tracks within a plurality of tracks arranged at a predetermined track pitch on a recording surface of the optical recording medium; a switching circuit for alternately switching the recording data and the reference data to output multiplexed data; and a recording head for recording the multiplexed data on the optical recording medium.

The present invention further provides an optical recording medium reproducing apparatus for reading recording data on an optical recording medium, and for processing the read recording data to reproduce m-value (m is an integer at least equal to two) digital data as reproduced data, comprising a reading head for irradiating a first light beam to n (n is an integer at least equal to two) neighboring tracks within a plurality of tracks arranged at a predetermined track pitch on a recording surface of the optical recording medium, and a second light beam and a third light beam sandwiching the first light beam to produce three read signals in accordance with the first to third light beams after having reflected off the optical recording medium; a reproduction processing circuit for at least one of adding and subtracting the three read signals in a predetermined ratio to produce a mixed read signal; and a decoder for decoding the mixed read signal into the reproduced data, wherein the predetermined ratio of the at least one of the addition and subtraction is controlled such that read levels corresponding to the n reference pits formed at different positions from each other in a track recording direction on the n neighboring tracks are in a ratio of k1:k2: . . . :kn in the mixed read signal, where k1–kn are integer coefficients.

Furthermore, the present invention provides an optical recording medium having recorded thereon recording data produced by processing m-value (m is an integer at least equal to two) digital information data, wherein the recording data is recorded by a recording method which satisfies a relationship expressed by:

$$y1 = (k1 \cdot x - k2 \cdot y2 - \ldots - kn \cdot yn) \bmod m$$

where k1–kn are integer coefficients;

x is information data;

y1–yn are recording data; and mod.m represents a modulo-m residue calculation, between the information data x and n (n is an integer at least equal to two) of the recording data y1–yn positioned at intersections of n neighboring tracks within a plurality of tracks arranged at a predetermined track pitch on a recording surface of the optical recording medium with a straight line being perpendicular to the n tracks.

DETAILED DESCRIPTION OF THE PREFERRED EMBODIMENTS

Figure 2:
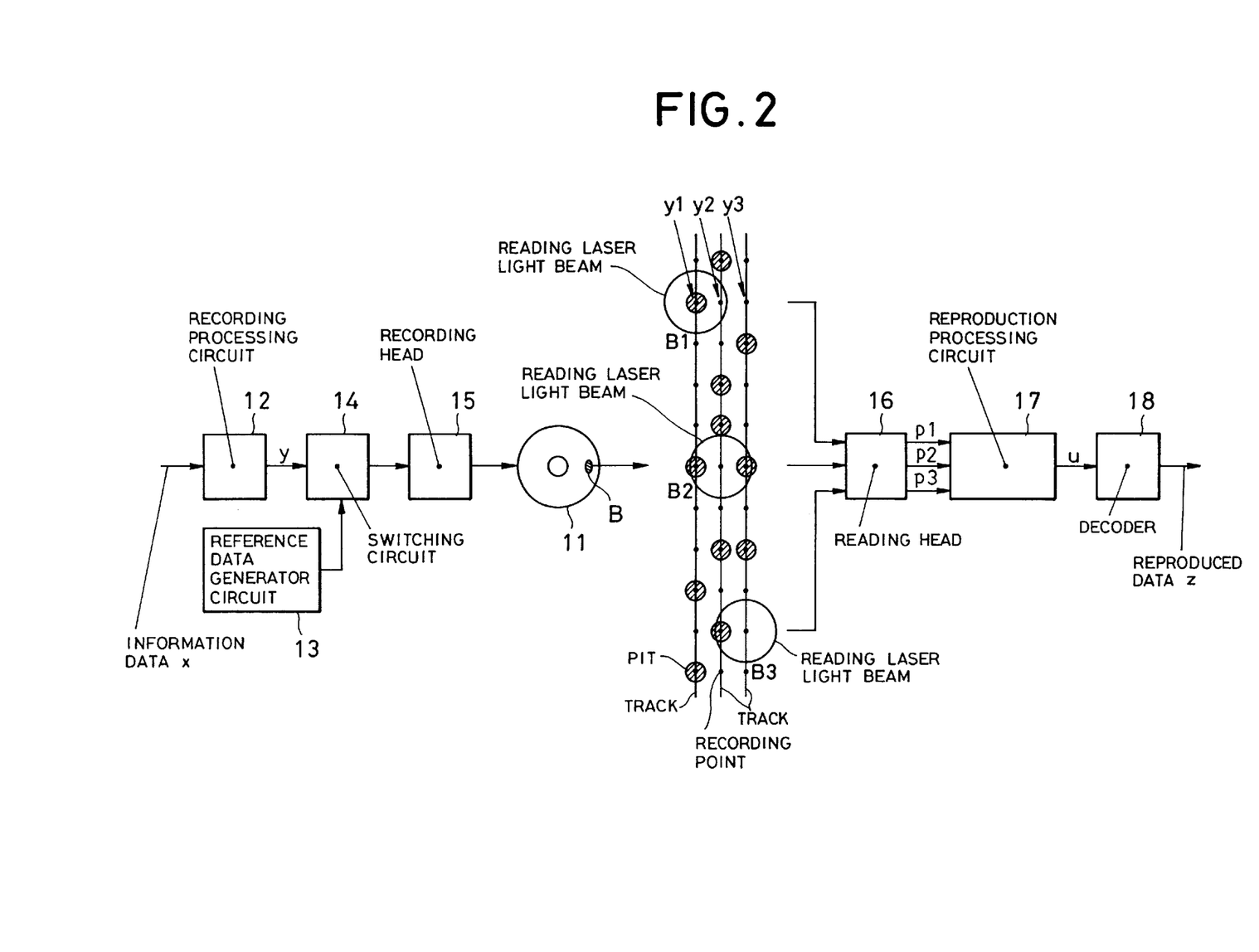
FIG. 2 is a block diagram illustrating a first embodiment of the present invention.

FIG. 2 illustrates an optical disc recording/reproducing apparatus as a first embodiment of the present invention, wherein recording points are arranged in a lattice form on a recording surface of an optical disc 11, and binary digital data is recorded at each recording point in the form of presence or absence of a pit. FIG. 2 also illustrates in enlarged view a portion B on the recording surface on the right-hand side of the optical disc 11, in which black dots represent the recording points.

A recording system in the optical disc recording/reproducing apparatus comprises a recording processing circuit 12; a reference data generator circuit 13; a switching circuit 14, and a recording head 15, while a reproducing system comprises a reading head 16; a reproduction processing circuit 17; and a decoder 18.

The recording processing circuit 12 receives information data x and outputs recording data y. The recording processing circuit 12 performs the following calculation with the information data x and three recording data y1, y2, y3 positioned on three neighboring tracks on the same radial line on the recording surface of the optical disc 11:

$$y1 = (x - 2 \cdot y2 - y3) \bmod.2 \tag{2}$$

where, mod.2 represents a modulo-2 residue calculation.

Since it is understood that in the equation (2), a residue calculation for the term 2·2y results in zero, the equation (2) can be simplified as follows:

$$y1 = (x - y3) \bmod.2 \tag{3}$$

Explaining the residue calculation for facilitating the understanding, consider for example:

$$A \bmod. B \tag{4}$$

A residue produced when "A" is divided by "B" is the result of this calculation, and this calculation result has the same polarity as "B."

The reference data generator circuit 13 generates reference data corresponding to a reference region including reference pits, later described. The switching circuit 14 alternately switches recording data from the recording processing circuit 12 and the reference data from the reference data generator circuit 13 to output multiplexed data to the recording head 15.

The recording head 15 turns on or off a recording laser light beam in accordance with the multiplexed data to form a train of pits on a track of the disc 11. Specifically, the recording head 15 turns on the recording laser light beam to form a pit when the multiplexed data is "1," and turns off the recording laser light beam to not form a pit when the multiplexed data is "0."

The reading head 16 irradiates three neighboring tracks with three reading laser light beams B1, B2, B3, and opto-electrically transduces the respective reading laser light beams after they have been reflected from the optical disc 11 to produce three read signals p1, p2, p3 in accordance with trains of pits recorded on the three tracks. In this case, since the track pitch is narrower than the radius of the reading laser light beam, the reading laser light beam B2 at the center simultaneously irradiates the tracks positioned on both inner and outer sides of the central track which is essentially irradiated therewith.

The reproduction processing circuit 17 receives the three read signals p1, p2, p3, and adds and/or subtracts them in a predetermined ratio to produce a mixed read signal which is supplied to the decoder 18. In this embodiment, the ratio of addition/subtraction is controlled such that the mixed read signal u is expressed by:

$$u = c(y1 + 2 \cdot y2 + y3) \tag{5}$$

where c is a real coefficient.

Stated another way, in this embodiment, instead of canceling crosstalk as is done in a crosstalk canceling circuit in a prior art apparatus, the three read signals are mixed such that crosstalk components from the three tracks are included in the mixed read signal u in a fixed integer ratio (1:2:1).

The decoder 18 determines the level of the mixed read signal u to reconstruct digital data. In this embodiment, since the level of the mixed read signal u may take one of five possible values 0, 1, 2, 3, 4 in accordance with whether a pit is present or not, the mixed read signal u is compared with four threshold values at 0.5, 1.5, 2.5, 3.5 to determine the level of the mixed read signal u. Then, the five-value data is subjected to a modulo-2 residue calculation to obtain reproduced data z. The reproduced data z thus reconstructed has a relationship established between itself and recording data y1, y2, y3 recorded on three tracks as expressed by:

$$z = (y1 + 2 \cdot y2 + y3) \bmod.2 \tag{6}$$

Figure 3:
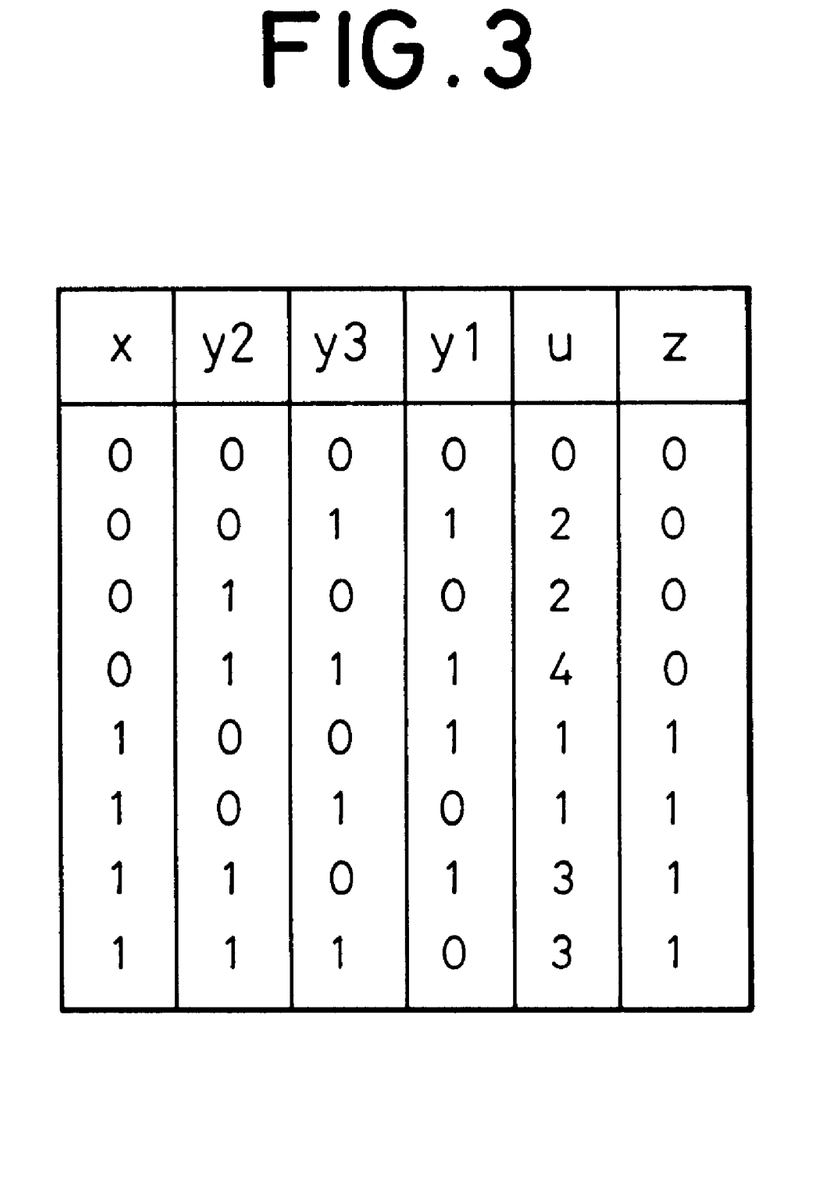
FIG. 3 is a table showing the relationship among information data x, recording data y, a mixed read signal u, and reproduced data z in the first embodiment.

The relationship among the foregoing information data x, recording data y, mixed read data u, and reproduced data z is shown in FIG. 3. It can be seen in FIG. 3 that the information x matches the reproduced data z, so that the data is correctly transmitted throughout the recording and reproducing systems.

Figure 4:
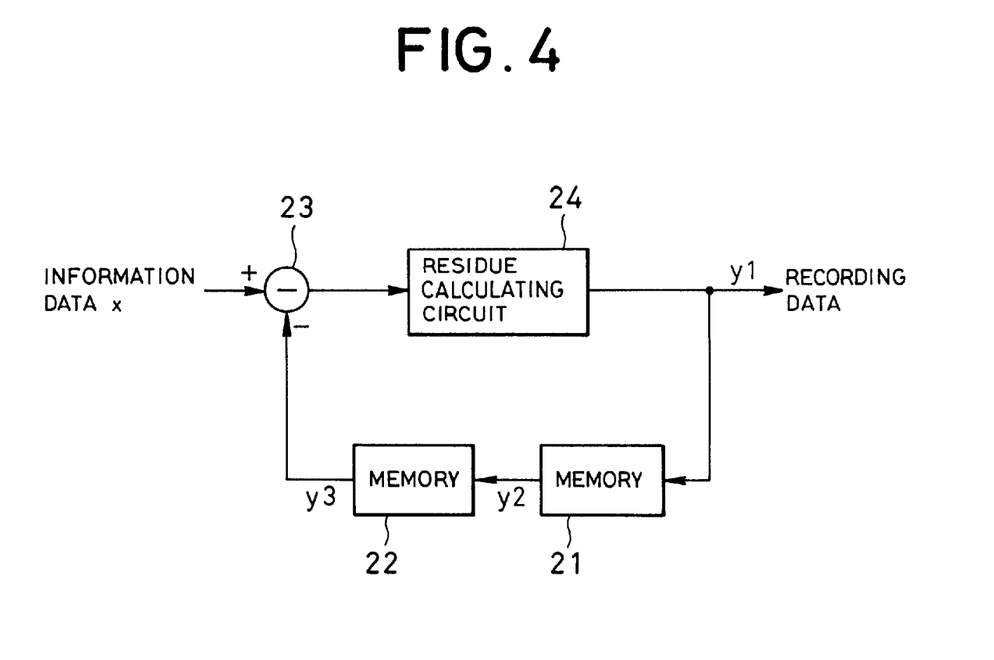
FIG. 4 is a block diagram illustrating a configuration of a recording processing circuit in the apparatus of FIG. 2.

FIG. 4 illustrates a configuration of the recording processing circuit 12. Memories 21, 22 each store a one-track portion of recording data to delay the recording data by a time corresponding to one track. A subtractor 23 and a modulo-2 residue calculating circuit 24 execute the logical operation as expressed by the aforementioned equation (3).

Figure 5:
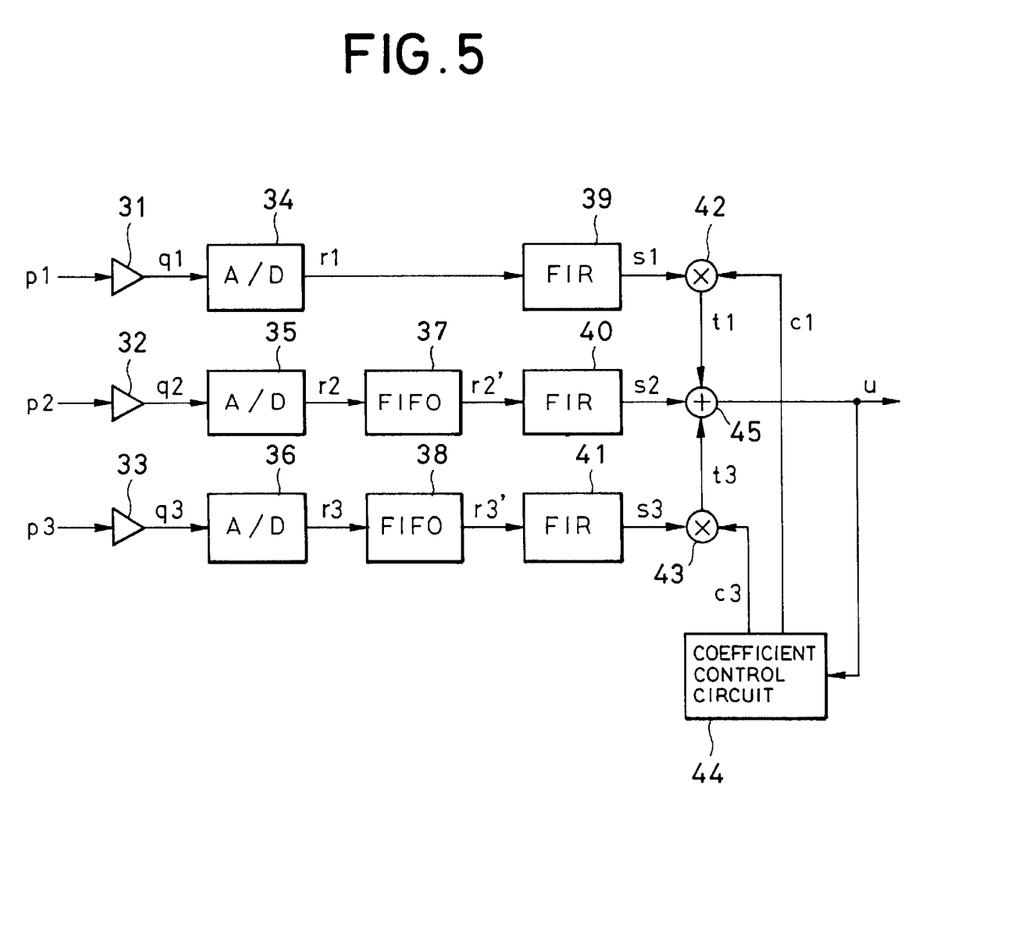
FIG. 5 is a block diagram illustrating a configuration of a reproduction processing circuit in the apparatus of FIG. 2.

FIG. 5 illustrates a configuration of the reproduction processing circuit 17. Amplifiers 31, 32, 33 each amplify a corresponding one of three read signals p1, p2, p3 output from the reading head 16 to deliver amplified signals q1, q2, q3, respectively. A/D converters 34, 35, 36 each A/D convert corresponding one of the read signals q1, q2, q3, as analog waveforms, to output read signals r1, r2, r3, respectively, as sample value sequences. FIFO memories 37, 38 adjust time differences between the three read signals caused by the three reading laser light beams spaced at regular intervals in the disc tangential direction to output three read signals equivalent to those possibly produced if the three reading laser light beams were arranged on the same radial line. Specifically, the FIFO memory 37 delays the signal r2 by a certain fixed number Nd of clocks to produce a signal r2', while the FIFO memory 38 delays the signal r3 by a number 2·Nd of clocks to produce a signal r3'. FIR digital filters 39, 40, 41 multiply the three signals r1, r2', r3' by appropriate frequency characteristics, respectively, to output signals s1, s2, s3. Multipliers 42, 43 multiply the signals s1, s3 by coefficients c1, c3 supplied from coefficient control circuit 44 to output signals t1, t3, respectively. An adder 45 adds the three signals t1, s2, t3 to output a mixed read signal u. The coefficient control circuit 44 compares read levels corresponding to reference pits, later described, to control the coefficients c1, c3 such that the read levels corresponding to the respective reference pits are in the ratio of 1:2:1. As a result, the mixed read signal u satisfies the equation (5).

It should be noted that instead of multiplying the signals s1, s3 by the coefficients c1, c3 in the multipliers 42, 43, all tap coefficients of the FIR digital filters 39, 41 may be multiplied by the coefficients c1, c3, in which case the multipliers can be omitted. It should also be noted that the coefficients may be positive or negative.

Figure 6:
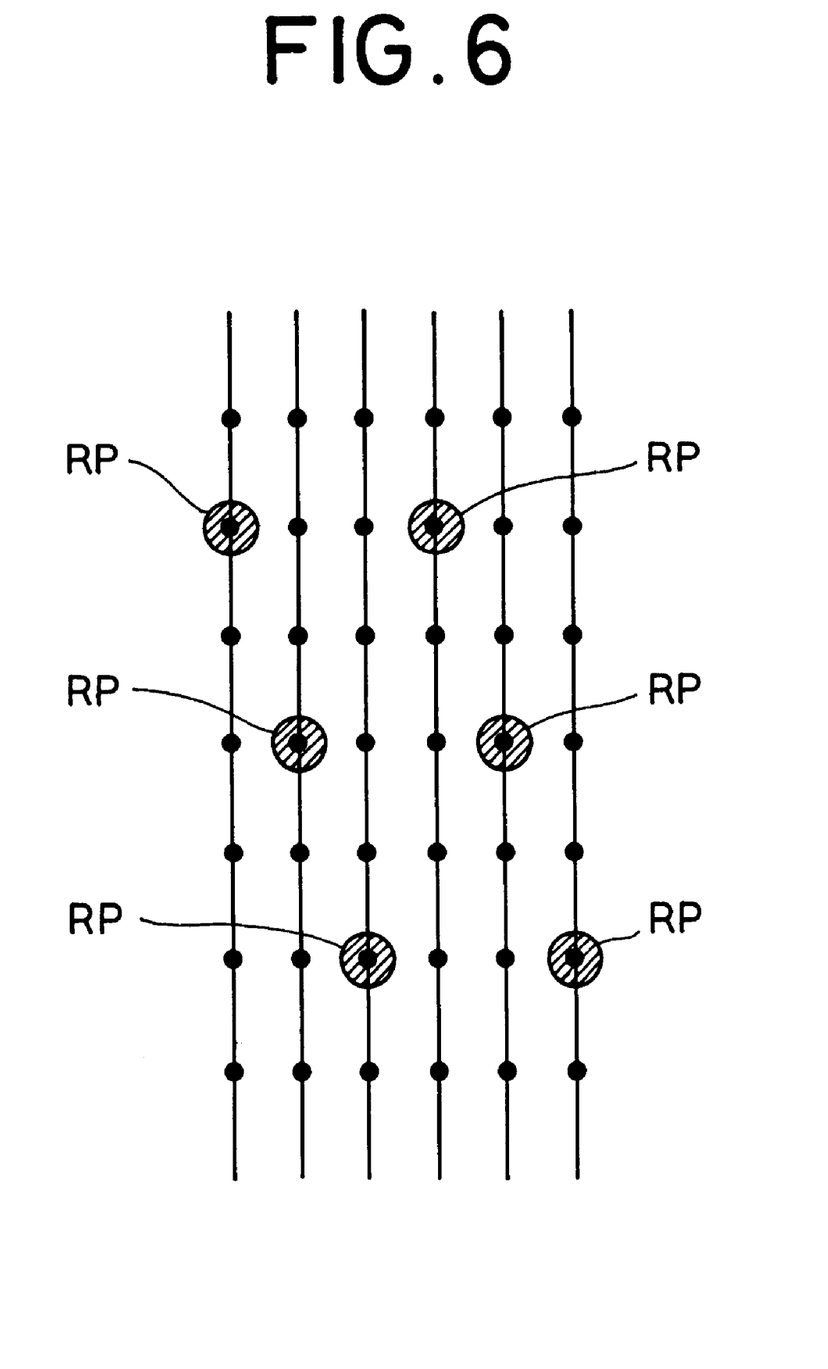
FIG. 6 shows how reference pits are arranged in respective reference regions.

FIG. 6 shows how the reference pits RP are placed in reference regions defined at regular periods in the circumferential direction of the disc 11 (in a track recording direction). Specifically, the same pit placements are repeated every three tracks, and three reference pits RP on the neighboring three tracks are placed at different positions from each other in the circumferential direction. When such reference regions are read, read signals corresponding to the reference pits RP are produced from the three tracks at different timing from each other, so that it is possible to detect a mixture ratio of the three read signals in a mixed read signal.

Figure 7:
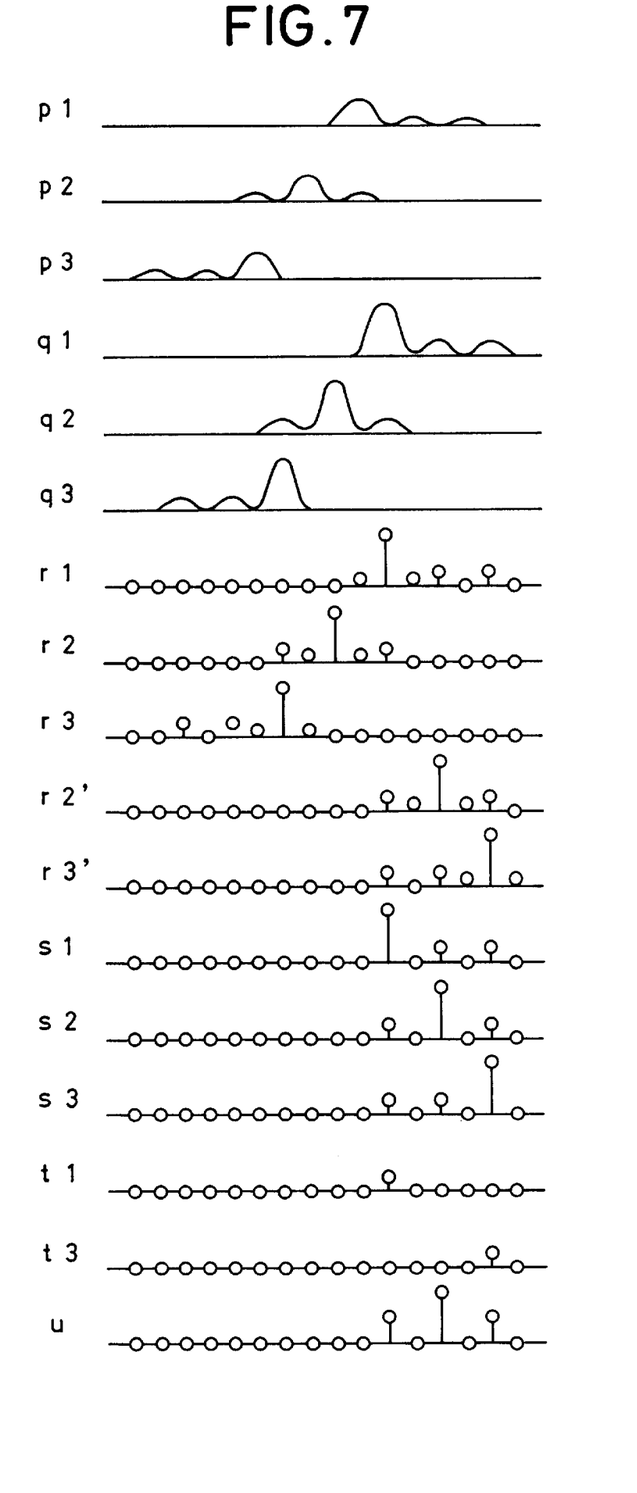
FIG. 7 illustrates waveforms of a variety of read signals in the reproduction processing circuit of FIG. 5.

FIG. 7 illustrates a variety of read signals when the reference regions are read, including output signals p1, p2, p3 of the reading head 16; output signals q1, q2, q3 of the amplifiers 31–33; output signals r1, r2, r3 of the A/D converters 34–36; output signals r2', r3' of the FIFO memories 37, 38; output signals s1, s2, s3 of the FIR digital filters 39–41; output signals t1, t3 of the multipliers 42, 43; and an output signal u of the adder 45. It should be noted that in FIG. 7, the waveforms are illustrated with a zero level defined by the level of a read signal when a region having no pit is read, for convenience of explanation.

As illustrated in FIG. 7, when the reference regions are read, the mixed read signal u is produced as having three peaks corresponding to three reference pits. The three peak levels indicate a mixture ratio in which read signals from the respective tracks are mixed in the mixed read signal u. Therefore, the coefficient control circuit 44 controls the coefficients c1, c3 such that the three peak levels are in the ratio of 1:2:1.

It should be noted that the read signal including the peaks corresponding to the reference pits may be used to automatically adjust delay amounts provided by the aforementioned FIFO memories 37, 38. Specifically, the intervals between the three reading laser light beams in the tangential direction of the disc 11 can be detected from time differences between the peaks in the read signal, so that read signals may be delayed by the FIFO memory 37, 38 by times corresponding to the intervals.

In the optical disc recording/reproducing apparatus as described above, the reading laser light beams are converged by an objective lens (not shown) to produce beam spots which are irradiated to the recording surface of the optical disc 11. A light intensity distribution of the beam spot is referred to as an "Airy pattern." At the center of the Airy pattern, 84% of the total amount of light is concentrated on a circle, which is referred to as an "Airy disc." Thus, the radius r of a beam can be defined by the radius of the Airy disc, and the following relationship is established:

$$r=0.61 \cdot \lambda/NA \tag{7}$$

where $\lambda$ is the wavelength of a laser, and NA is the numerical aperture of an objective lens.

Generally, the track pitch Tp of an optical disc is chosen to be wider than the beam radius r. Actually, in DVD (Digital Video Disc), the beam radius r is calculated to be 0.66 μm (r=0.66 μm) from λ=650 nm and NA=0.6, and Tp is chosen to be 0.74 μm (Tp=0.74 μm). That is to say, the following relationship is established:

$$Tp=0.68 \cdot \lambda/NA \tag{8}$$

When a crosstalk canceler is used, the track pitch can be made narrower than the beam radius. For example, as disclosed in "High Density Optical Disc Reproducing Apparatus using Crosstalk Canceler" on page 1,123 in preprint manuscripts of the 45th Applied Physics Related Joint Conference, the track pitch Tp can be reduced to 0.55 μm (Tp=0.55 μm) for r=0.66 μm derived from λ=650 nm and NA=0.6. In other words, the following relationship is established:

$$Tp=0.51 \cdot \lambda/NA \tag{9}$$

Further, according to the present invention, the track pitch can be additionally narrowed. That is to say, the following relationship can be established:

$$Tp \leq 0.5 \cdot \lambda/NA \tag{10}$$

The present invention is also applicable to any digital data recording other than the recording of binary digital data in the form of presence or absence of a pit. As a technique of recording multi-value digital data based on the positions of pit edges, an SCIPER (Single Carrier Independent Pit Edge Recording) method is known. In the SCIPER method, pits are placed on tracks at regular intervals, and the positions of a leading edge and a trailing edge of a pit are step-wisely changed in accordance with data to be recorded in each edge. For example, when ternary data "0," "1," "2" are recorded, the positions of the edges of an associated pit are shifted by a distance d in a direction in which the pitch becomes shorter when data "0" is recorded; the positions of the edges of an associated pit are maintained unchanged when data "1" is recorded; and the positions of the edges of an associated pit are shifted by the distance d in a direction in which the pit becomes longer when data "2" is recorded.

Figure 8:
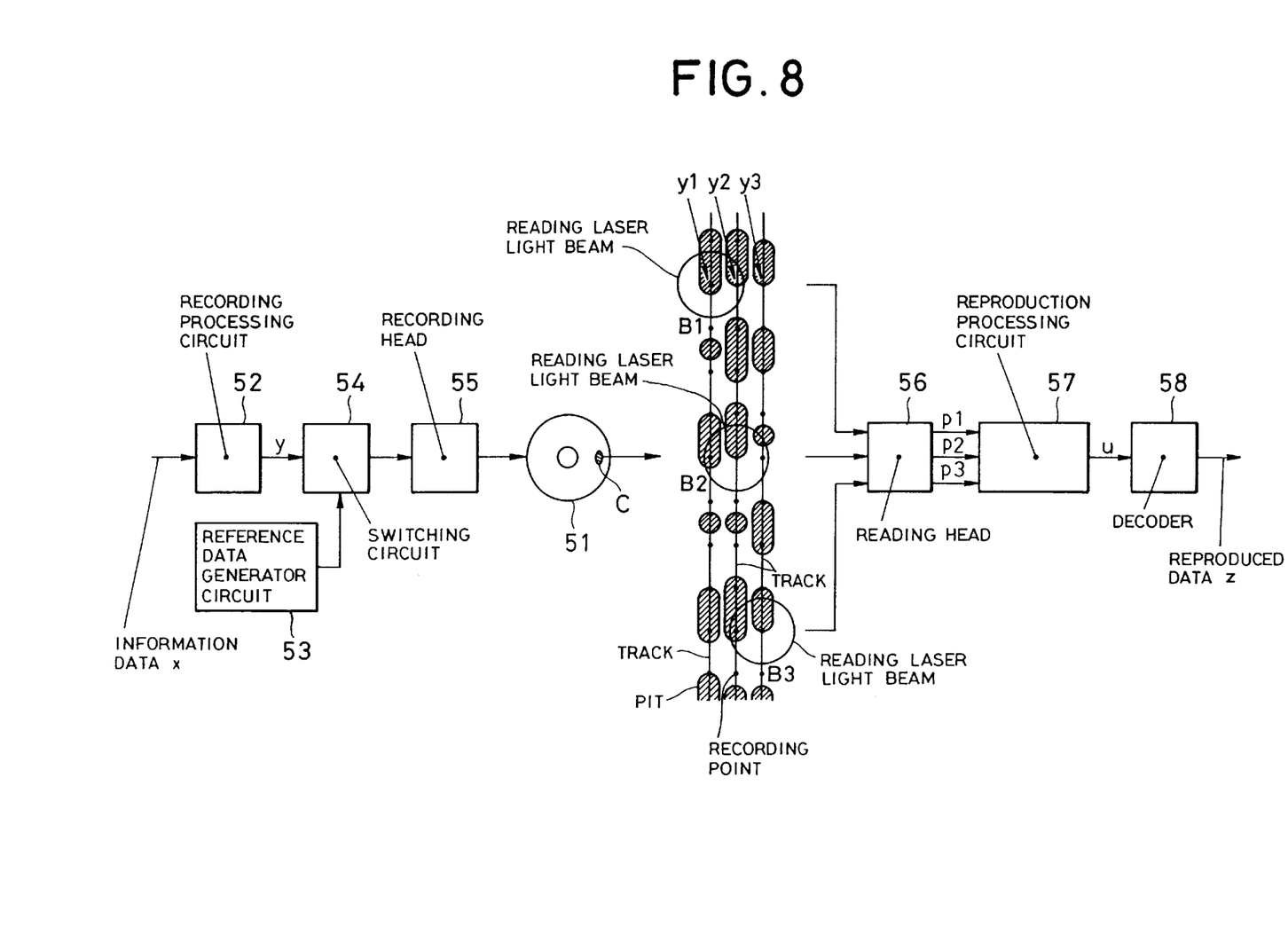
FIG. 8 is a block diagram illustrating a second embodiment of the present invention.

FIG. 8 illustrates an optical disc recording/reproducing apparatus according to a second embodiment of the present invention, wherein recording points are arranged in a lattice form on a recording surface of an optical disc 51, and ternary digital data is recorded at each recording point in accordance with the SCIPER method. FIG. 8 also illustrates in enlarged view a portion C on the recording surface on the right-hand side of the optical disc 51, in which black dots represent the recording points.

A recording system in the optical disc recording/reproducing apparatus comprises a recording processing circuit 52; a reference data generator circuit 53; a switching circuit 54, and a recording head 55, while a reproducing system comprises a reading head 56; a reproduction processing circuit 57; and a decoder 58.

The recording processing circuit 52 receives information data x and outputs recording data y. The recording processing circuit 52 performs the following calculation with the information data x and three recording data y1, y2, y3 positioned on three neighboring tracks on the same radial line on the recording surface of the optical disc 51:

$$y1=(x-2 \cdot y2-y3) \bmod.3 \qquad (11)$$

where, mod.3 represents a modulo-3 residue calculation.

The reference data generator circuit 53 generates reference data corresponding to a reference region including reference pits, later described. The switching circuit 54 alternately switches recording data from the recording processing circuit 52 and the reference data from the reference data generator circuit 53 to output multiplexed data to the recording head 55.

The recording head 55 changes the timing at which a recording laser light beam is turned on or off in accordance with the multiplexed data to form a train of pits on a track of the disc 51. Specifically, the recording head 55 changes the timing of turning on or off the recording laser light beam such that the length of the pit becomes shorter when the multiplexed data is "0," and such that the length of the pit becomes longer when the multiplexed data is "2."

The reading head 56 irradiates three neighboring tracks with three reading laser light beams B1, B2, B3, and opto-electrically transduces the respective reading laser light beams after they have been reflected from the optical disc 51 to produce three read signals p1, p2, p3 in accordance with trains of pits recorded on the three tracks. In this case, since the track pitch is narrower than the radius of the reading laser light beam, the reading laser light beam B2 at the center simultaneously irradiates the tracks positioned on both inner and outer sides of the central track which is essentially irradiated therewith.

The reproduction processing circuit 57 receives the three read signals p1, p2, p3, and adds and/or subtracts them in a predetermined ratio to produce a mixed read signal. In this embodiment, the ratio of addition/subtraction is controlled such that the mixed read signal u is expressed by the aforementioned equation (5). Specifically, instead of canceling crosstalk as is done in a crosstalk canceling circuit in a prior art apparatus, the three read signals are mixed such that crosstalk components from the three tracks are included in the mixed read signal u in a fixed integer ratio (1:2:1).

The decoder 58 determines the level of the mixed read signal u to reconstruct digital data. In this embodiment, since the level of the mixed read signal u may take one of nine possible values in a range of 0 to 8 in accordance with the positions of pit edges, the mixed read signal u is compared with eight threshold values from 0.5 to 7.5 to determine the level of the mixed read signal u. Then, the nine-value data is subjected to a modulo-3 residue calculation to obtain reproduced data z. The reproduced data z thus obtained has a relationship established between itself and recording data y1, y2, y3 recorded on three tracks as expressed by:

$$z=(y1+2 \cdot y2+y3) \bmod.3 \qquad (12)$$

Figure 9:
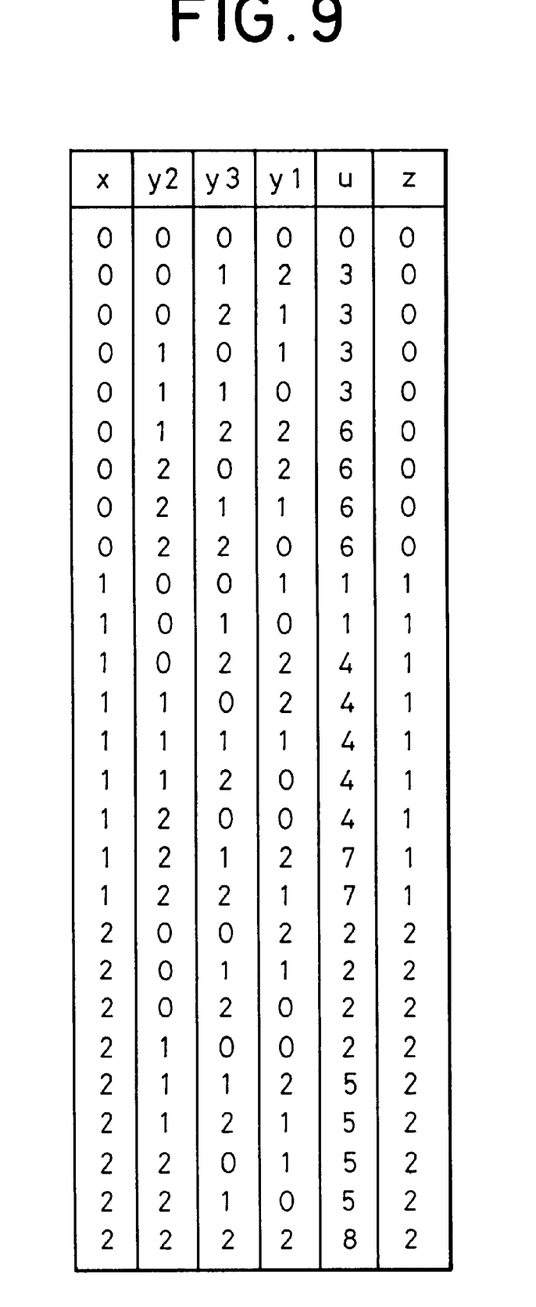
FIG. 9 is a table showing the relationship among information data x, recording data y, a mixed read signal u, and reproduced data z in the second embodiment.

The relationship among the foregoing information data x, recording data y, mixed read data u, and reproduced data z is shown in FIG. 9. It can be seen in FIG. 9 that the information data x matches the reproduced data z, so that the data is correctly transmitted throughout the recording and reproducing systems.

Figure 10:
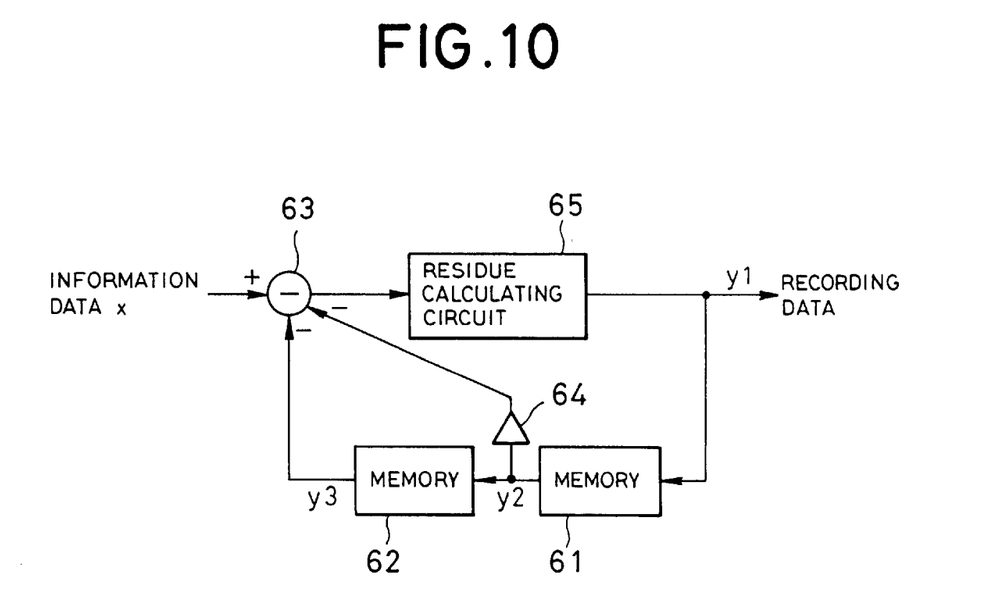
FIG. 10 is a block diagram illustrating a configuration of a recording processing circuit in the apparatus of FIG. 8.

FIG. 10 illustrates a configuration of the recording processing circuit 52. Memories 61, 62 each store a one-track portion of recording data to delay the recording data by a time corresponding to one track. A subtractor 63, a coefficient circuit 64, and a modulo-3 residue calculating circuit 65 execute the logical operation as expressed by the aforementioned equation (11).

The reproduction processing circuit 57 has the same configuration as that of the reproduction processing circuit 17 in FIG. 5.

Figure 11:
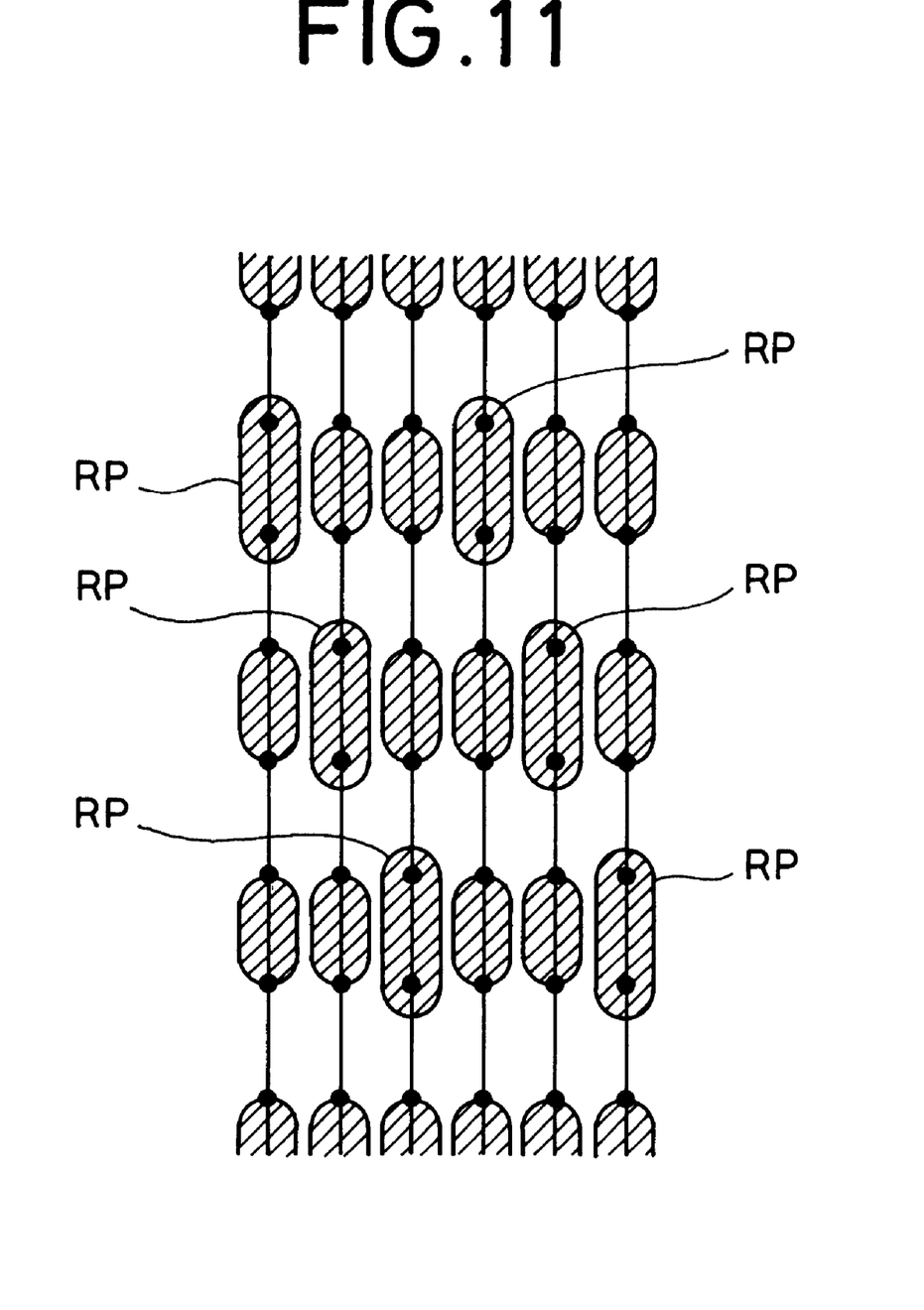
FIG. 11 shows how reference pits are arranged in respective reference regions.

While the reference pit used in this embodiment may be the same as that illustrated in FIG. 6, reference pits RP having different pit lengths may be provided in a pit train of a fixed length, as illustrated in FIG. 11. Specifically, the same pit placements are repeated every three tracks, so that three reference pits RP on three neighboring tracks are placed at different positions from each other. When such reference regions are read, read signals corresponding to the reference pits RP are produced from the three tracks at different timing from each other, so that it is possible to detect a mixture ratio of the three read signals in a mixed read signal.

Figure 12:
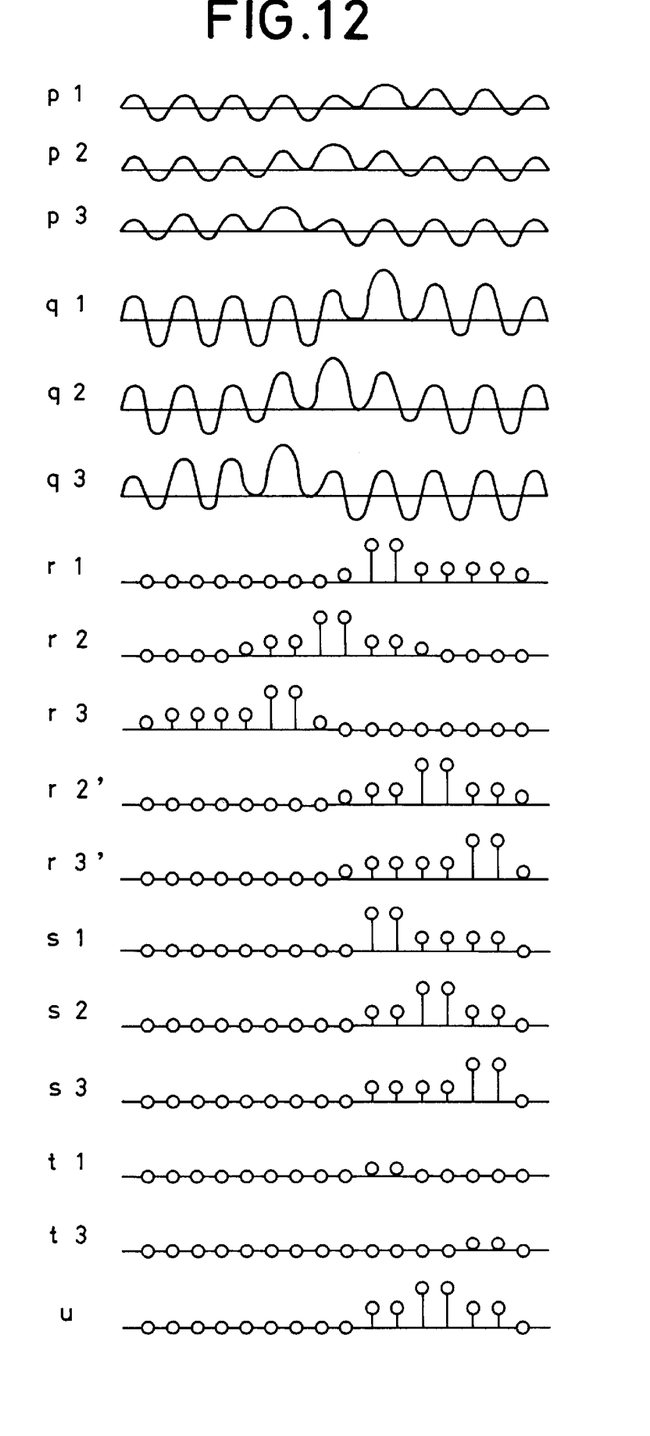
FIG. 12 illustrates waveforms of a variety of read signals in the reproduction processing circuit of FIG. 8.

FIG. 12 illustrates a variety of read signals when the reference regions in FIG. 11 are read, including output signals p1, p2, p3 of the reading head 56; output signals q1, q2, q3 of amplifiers 31–33; output signals r1, r2, r3 of A/D converters 34–36; output signals r2', r3' of FIFO memories 37, 38; output signals s1, s2, s3 of FIR digital filters 39–41; output signals t1, t3 of multipliers 42, 43; and an output signal u of adder 45. It should be noted that in FIG. 12, the waveforms are illustrated with a zero level defined by the level of a read signal detected when the pit train of the fixed length is read, for convenience of explanation.

As illustrated in FIG. 12, when the reference regions are read, the mixed read signal u is produced as having three peaks corresponding to three reference pits. The three peak levels indicate a mixture ratio in which read signals from the respective tracks are mixed in the mixed read signal u. Therefore, the coefficient control circuit 44 controls the coefficients c1, c3 such that the three peak levels is in the ratio of 1:2:1.

It should be noted that the read signal including the peaks corresponding to the reference pits may be used to automatically adjust delay amounts provided by the aforementioned FIFO memories 37, 38. Specifically, the intervals of the three reading laser light beams in the tangential direction of the disc 51 can be detected from time differences between the peaks in the read signal, so that the read signal may be delayed by the FIFO memory 37, 38 by times corresponding to the intervals.

The present invention is not limited to the SCIPER method for recording ternary digital data, but may also be applied to SCIPER methods for recording binary digital data, and digital data having four or more values.

Also, the mixture ratio for read signals is not limited to 1:2:1 but may be, for example, 1:3:1.

Further, the reading laser light beams on both inner and outer sides of the central track are not limited to tracing tracks directly adjacent to a target track, but may trace more inner or more outer tracks.

Further, the number of tracks simultaneously irradiated with the central reading laser light beam is not limited to three, but may be, for example, two, in which case the mixture ratio for read signals may be 1:1. Further alternatively, the number of tracks simultaneously irradiated with the central reading laser light beam may be, for example, four, in which case the mixture ratio for read signals may be in an integer ratio such as, for example, 1:2:2:1 or 1:3:3:1. When an even-number of tracks are simultaneously irradiated with the central reading laser light beam in this way, the central reading laser light beam traces a center line between two tracks, i.e., between tracks.

While in the foregoing embodiment, the reference regions are provided at regular periods on the disc, the present invention is not limited to such reference regions. Alternatively, the level of a mixed read signal is observed, for example, to create a histogram which indicates the frequencies of respective levels. Then, the multiplying coefficients $c_1$, $c_3$ are controlled such that peak positions in the histogram represent desired levels and the peaks are as sharp as possible. As described above, since the level of a mixed read signal should take one of five possible values 0, 1, 2, 3, 4 in the first embodiment, the multiplying coefficients $c_1$, $c_3$ may be controlled such that five sharp peaks appear in the histogram. The histogram may be created by providing a RAM which stores the respective levels as addresses and the frequencies as data associated with the respective addresses. Then, the multiplying coefficients $c_1$, $c_3$ may be controlled by a CPU which monitors that RAM.

While the foregoing embodiments have been described for an optical disc and a recording/reproducing method and apparatus therefor to which the present invention is applied, the present invention may also be applied to any optical recording medium other than the optical disc, such as a card or the like, and a recording/reproducing method adapted to any particular medium.

According to the present invention, the track pitch can be significantly narrowed as compared with the radius of a reading laser light beam, and digital information data can be correctly reconstructed even from an optical recording medium such as an optical disc on which information data is recorded at a higher density.

What is claimed is:

1. An optical recording medium recording/reproducing method for processing m-value (m is an integer at least equal to two) digital information data to produce recording data, for recording said recording data on an optical recording medium, for reading said recording data from said optical recording medium, and for processing said read recording data to reproduce said information data as reproduced data, comprising:

establishing a relationship expressed by:

$$y1=(k1 \cdot x - k2 \cdot y2 - \ldots - kn \cdot yn) \bmod m$$

where
    $k1$–$kn$ are integer coefficients;
    x is information data;
    $y1$–$yn$ are recording data; and
    mod.m represents a modulo-m residue calculation, between said information data x and n (n is an integer at least equal to two) of said recording data $y1$–$yn$ positioned at intersections of n neighboring tracks within a plurality of tracks arranged at a predetermined track pitch on a recording surface of said optical recording medium with a straight line being perpendicular to said n tracks; and establishing a relationship expressed by:

$$z=(k1 \cdot y1 + k2 \cdot y2 + \ldots + kn \cdot yn) \bmod m$$

where z is reproduced data,
    between said reproduced data z and said recording data $y1$–$yn$.

2. An optical recording medium recording/reproducing method according to claim 1, wherein:
    said track pitch Tp of said optical recording medium satisfies:

$$Tp \leq 0.5 \cdot \lambda / NA$$

where $\lambda$ is the wavelength of irradiating light for reading said recording data, and NA is the numerical aperture of an objective lens.

3. An optical recording medium recording apparatus for processing m-value (m is an integer at least equal to two) digital information data to produce recording data, and for recording said recording data on an optical recording medium, said recording apparatus comprising:

a recording processing circuit for performing a calculation expressed by:

$$y1=(k1 \cdot x - k2 \cdot y2 - \ldots - kn \cdot yn) \bmod m$$

where
    $k1$–$kn$ are integer coefficients;
    x is information data;
    $y1$–$yn$ are recording data; and
    mod.m represents a modulo-m residue calculation, between said information data x and n (n is an integer at least equal to two) of said recording data $y1$–$yn$ positioned at intersections of n neighboring tracks within a plurality of tracks arranged at a predetermined track pitch on a recording surface of said optical recording medium with a straight line being perpendicular to said n tracks; and a recording head for recording said recording data on said optical recording medium.

4. An optical recording medium reproducing apparatus for reading recording data on an optical recording medium, and for processing the read recording data to reproduce m-value (m is an integer at least equal to two) digital data as reproduced data, said reproducing apparatus comprising:

a reading head for irradiating a first light beam to n (n is an integer at least equal to two) neighboring tracks within a plurality of tracks arranged at a predetermined track pitch on a recording surface of said optical recording medium, and a second light beam and a third light beam sandwiching said first light beam to produce three read signals in accordance with said first to third light beams after having reflected off said optical recording medium;

a reproduction processing circuit for at least one of adding and subtracting said three read signals in a predetermined ratio to produce a mixed read signal; and a decoder for decoding said mixed read signal into said reproduced data, wherein a relationship expressed by:

$$z=(k1 \cdot y1 + k2 \cdot y2 + \ldots + kn \cdot yn) \bmod m$$

where
    $k1$–$kn$ are integer coefficients;
    $y1$–$yn$ are recording data;

z is reproduced data; and mod.m represents a modulo-m residue calculation, is established between said reproduced data z and said recording data y1–yn positioned at intersections of n neighboring tracks with a straight line being perpendicular to said n tracks.

5. An optical recording medium recording/reproducing method for processing m-value (m is an integer at least equal to two) digital information data to produce recording data, for recording said recording data on an optical recording medium, for reading said recording data from said optical recording medium, and for processing said read recording data to reproduce said information data as reproduced data, wherein:

said method including, during recording, defining recording regions for recording said recording data therein, and reference regions each having n (n is an integer at least equal to two) reference pits formed at different positions from each other in a track recording direction on n neighboring tracks within a plurality of tracks arranged at a predetermined track pitch on a recording surface of said optical recording medium, said recording regions and said reference regions being positioned alternately in the track recording direction of said optical recording medium;

said method including, during reproduction, irradiating a first light beam to said n neighboring tracks, and a second light beam and a third light beam sandwiching said first light beam to produce three read signals in accordance with said first to third light beams after having been reflected off said optical recording medium, at least one of adding and subtracting said three read signals in a predetermined ratio to produce a mixed read signal, and decoding said mixed read signal into said reproduced data; and said method further including controlling the predetermined ratio of the at least one of the addition and subtraction such that read levels corresponding to said n reference pits are in a ratio of k1:k2: . . . :kn in said mixed read signal, where k1–kn are integer coefficients.

6. An optical recording medium recording apparatus for recording m-value (m is an integer at least equal to two) digital information data on an optical recording medium, comprising:

a recording processing circuit for subjecting said information data to a logical operation to output recording data;

a reference data generating circuit for generating reference data corresponding to n (n is an integer at least equal to two) reference pits formed at different positions in a track recording direction on n neighboring tracks within a plurality of tracks arranged at a predetermined track pitch on a recording surface of said optical recording medium;

a switching circuit for alternately switching said recording data and said reference data to output multiplexed data; and a recording head for recording said multiplexed data on said optical recording medium.

7. An optical recording medium reproducing apparatus for reading recording data on an optical recording medium, and for processing the read recording data to reproduce m-value (m is an integer at least equal to two) digital data as reproduced data, comprising:

a reading head for irradiating a first light beam to n (n is an integer at least equal to two) neighboring tracks within a plurality of tracks arranged at a predetermined track pitch on a recording surface of said optical recording medium, and a second light beam and a third light beam sandwiching said first light beam to produce three read signals in accordance with said first to third light beams after having reflected off said optical recording medium;

a reproduction processing circuit for at least one of adding and subtracting said three read signals in a predetermined ratio to produce a mixed read signal; and a decoder for decoding said mixed read signal into said reproduced data, wherein the predetermined ratio of the at least one of the addition and subtraction is controlled such that read levels corresponding to said n reference pits formed at different positions from each other in a track recording direction on said n neighboring tracks are in a ratio of k1:k2: . . . :kn in said mixed read signal, where k1–kn are integer coefficients.

8. An optical recording medium having recorded thereon recording data produced by processing m-value (m is an integer at least equal to two) digital information data, wherein:

said recording data is recorded by a recording method which satisfies a relationship expressed by:

$$y1 = (k1 \cdot x - k2 \cdot y2 - \ldots - kn \cdot yn) \bmod m$$

where k1–kn are integer coefficients;

x is information data;

y1–yn are recording data; and mod.m represents a modulo-m residue calculation, between said information data x and n (n is an integer at least equal to two) of said recording data y1–yn positioned at intersections of n neighboring tracks within a plurality of tracks arranged at a predetermined track pitch on a recording surface of said optical recording medium with a straight line being perpendicular to said n tracks.

9. An optical recording medium according to claim 8, wherein:

said track pitch Tp of said optical recording medium satisfies:

$$Tp \leq 0.5 \cdot \lambda / NA$$

where $\lambda$ is the wavelength of irradiating light for reading said recording data, and NA is the numerical aperture of an objective lens.

* * * * *